(12) United States Patent
Lulich et al.

(10) Patent No.: US 7,526,796 B2
(45) Date of Patent: Apr. 28, 2009

(54) METHODS AND APPARATUS FOR SECURELY SIGNING ON TO A WEBSITE VIA A SECURITY WEBSITE

(75) Inventors: Daniel P. Lulich, Portland, OR (US); Greg Pierson, Woodland, WA (US); Ron Lunde, Portland, OR (US)

(73) Assignee: Iovation, Inc., Portland, OR (US)

( * ) Notice: Subject to any disclaimer, the term of this patent is extended or adjusted under 35 U.S.C. 154(b) by 0 days.

(21) Appl. No.: 11/863,603

(22) Filed: Sep. 28, 2007

(65) Prior Publication Data
US 2008/0083017 A1    Apr. 3, 2008

Related U.S. Application Data

(60) Provisional application No. 60/827,590, filed on Sep. 29, 2006.

(51) Int. Cl.
*H04L 9/00* (2006.01)
(52) U.S. Cl. .............................. 726/4; 705/79
(58) Field of Classification Search .................. 726/29; 705/79
See application file for complete search history.

(56) References Cited

U.S. PATENT DOCUMENTS

| | | | |
|---|---|---|---|
| 2003/0028762 A1* | 2/2003 | Trilli et al. ................... | 713/153 |
| 2004/0049587 A1* | 3/2004 | Henaff et al. ............... | 709/229 |
| 2004/0158574 A1* | 8/2004 | Tom et al. ................... | 707/102 |
| 2004/0230831 A1* | 11/2004 | Spelman et al. ............. | 713/201 |
| 2005/0182660 A1* | 8/2005 | Henley .......................... | 705/2 |
| 2006/0129835 A1* | 6/2006 | Ellmore ....................... | 713/183 |

OTHER PUBLICATIONS

Yee et al, "Passpet: Convenient Password Management and Phishing Protection", Jul. 2006, Symposium On Usable Privacy and Security, pp. 32-43.*

* cited by examiner

*Primary Examiner*—Matthew B Smithers
(74) *Attorney, Agent, or Firm*—Schwabe Williamson & Wyatt PC

(57) ABSTRACT

A method of providing a security website and verifying, by the security website, that a device of a user is authorized to access another website when the user attempts to access the another website via the security website.

21 Claims, 2 Drawing Sheets

METHODS AND APPARATUS FOR SECURELY SIGNING ON TO A WEBSITE VIA A SECURITY WEBSITE

CROSS REFERENCE TO RELATED APPLICATIONS

The present application claims priority to U.S. patent application Ser. No. 60/827,590, filed Sep. 29, 2006, entitled "Secure Sign-On," the entire disclosure of which is hereby incorporated by reference in its entirety.

TECHNICAL FIELD

Embodiments of the present invention relate to the field of data processing, and more particularly, to secure signing on to online services.

BACKGROUND

Advances in integrated circuit, processor and related technologies have led to the proliferation of a wide variety of computational devices having a wide range of computing capability. At the same time, advances in telecommunication, networking and other related technologies have the led to the proliferation of networked computing. Today, users, using a variety of client computing devices may access a wide variety of online services including, for example, obtaining data, merchandising, and multimedia (such as, for example, music and/or video) services.

For a variety of reasons, including, but not limited to, being compensated for merchandising and/or services, data security, and privacy, many online services require sign-on as part of the process to ensure the services are being consumed by authorized users.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)". For the purposes of the present invention, the phrase "at least one of A, B, and C" means "(A), (B), (C), (A and B), (A and C), (B and C), or (A, B and C)". For the purposes of the present invention, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention provide methods and apparatus for signing on to a website via a security website.

Figure 1:
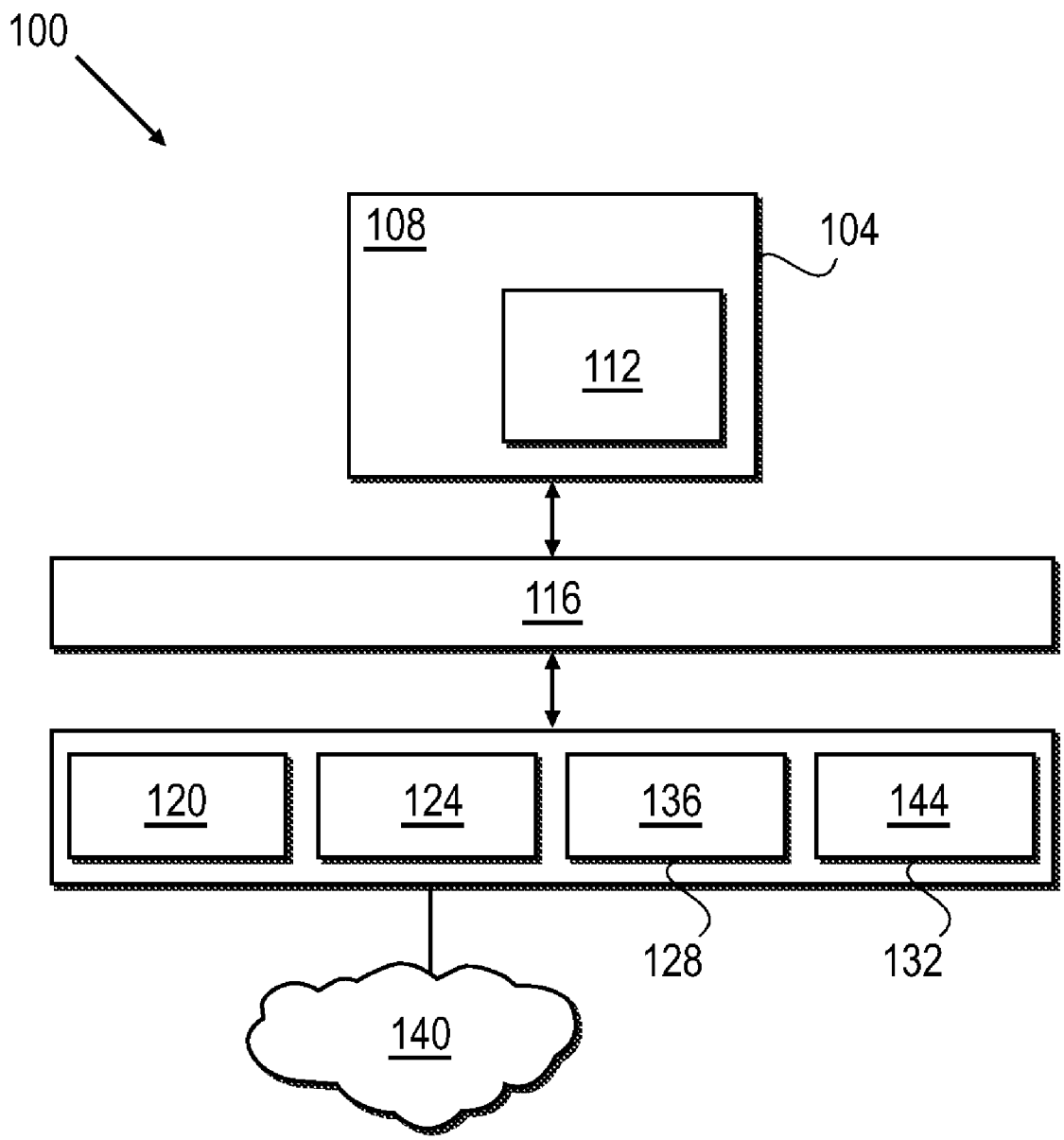
FIG. 1 schematically illustrates a computer system, in accordance with various embodiments of the present invention.

FIG. 1 schematically illustrates a computer system 100 that may operate as a server, a client device, database, etc., in accordance with various embodiments of the present invention. The system 100 may have an execution environment 104, which may be the domain of an executing operating system (OS) 108. The OS 108 may be a component configured to execute and control general operation of other components within the execution environment 104, such as a software component 112, subject to management by a management module 116. The management module 116 may arbitrate general component access to hardware resources such as one or more processor(s) 120, network interface controller 124, storage 128, and/or memory 132.

In some embodiments, the component 112 may be a supervisory-level component, e.g., a kernel component. In various embodiments, a kernel component may be services (e.g., loader, scheduler, memory manager, etc.), extensions/drivers (e.g., for a network card, a universal serial bus (USB) interface, a disk drive, etc.), or a service-driver hybrid (e.g., intrusion detectors to watch execution of code).

The processor(s) 120 may execute programming instructions of components of the system 100. The processor(s) 120 may be single and/or multiple-core processor(s), controller(s), application specific integrated circuit(s) (ASIC(s)), etc.

In an embodiment, storage 128 may represent non-volatile storage to store persistent content to be used for the execution of the components of the system 100, such as, but not limited to, operating system(s), program files, configuration files, etc. In an embodiment, storage 128 may include stored content 136, which may represent the persistent store of source content for the component 112. The persistent store of source content may include, e.g., executable code store that may have executable files and/or code segments, links to other routines (e.g., a call to a dynamic linked library (DLL)), a data segment, etc.

In various embodiments, storage 128 may include integrated and/or peripheral storage devices, such as, but not limited to, disks and associated drives (e.g., magnetic, optical), universal serial bus (USB) storage devices and associated ports, flash memory, ROM, non-volatile semiconductor devices, etc.

In various embodiments, storage 128 may be a storage resource that is physically part of the system 100 or it may be accessible by, but not necessarily, a part of the system 100. For example, the storage 128 may be accessed by the system 100 over a network 140 via the network interface controller 124. Additionally, multiple systems 100 may be operatively coupled to one another via network 140.

Upon a load request, e.g., from a loading agent of the OS 108, the management module 116 and/or the OS 108 may load the stored content 136 from storage 128 into memory 132 as active content 144 for operation of the component 112 in the execution environment 104.

In various embodiments, the memory 132 may be volatile storage to provide active content for operation of components on the system 100. In various embodiments, the memory 132 may include RAM, dynamic RAM (DRAM), static RAM (SRAM), synchronous DRAM (SDRAM), dual-data rate RAM (DDRRAM), etc.

In some embodiments the memory 132 may organize content stored therein into a number of groups of memory locations. These organizational groups, which may be fixed and/or variable sized, may facilitate virtual memory management. The groups of memory locations may be pages, segments, or a combination thereof.

As used herein, the term "component" is intended to refer to programming logic and associated data that may be employed to obtain a desired outcome. The term component may be synonymous with "module" or "agent" and may refer to programming logic that may be embodied in hardware or firmware, or in a collection of software instructions, possibly having entry and exit points, written in a programming language, such as, for example, C++, Intel Architecture 32bit (IA-32) executable code, etc.

A software component may be compiled and linked into an executable program, or installed in a dynamic link library, or may be written in an interpretive language such as BASIC. It will be appreciated that software components may be callable from other components or from themselves, and/or may be invoked in response to detected events or interrupts. Software instructions may be provided in a machine accessible medium, which when accessed, may result in a machine performing operations or executions described in conjunction with components of embodiments of the present invention. Machine accessible medium may be firmware, e.g., an electrically erasable programmable read-only memory (EEPROM), or other recordable/non-recordable medium, e.g., read-only memory (ROM), random access memory (RAM), magnetic disk storage, optical disk storage, etc. It will be further appreciated that hardware components may be comprised of connected logic units, such as gates and flip-flops, and/or may be comprised of programmable units, such as programmable gate arrays or processors. In some embodiments, the components described herein are implemented as software modules, but nonetheless may be represented in hardware or firmware. Furthermore, although only a given number of discrete software/hardware components may be illustrated and/or described, such components may nonetheless be represented by additional components or fewer components without departing from the spirit and scope of embodiments of the invention.

In embodiments of the present invention, an article of manufacture may be employed to implement one or more methods as disclosed herein. For example, in exemplary embodiments, an article of manufacture may comprise a storage medium and a plurality of programming instructions stored in the storage medium and adapted to program an apparatus to enable the apparatus to request from a proxy server one or more location restriction(s) to modify one or more user preference(s). In various ones of these embodiments, programming instructions may be adapted to modify one or more user preferences to subject the one or more user preferences to one or more location restrictions. In various embodiments, article of manufacture may be employed to implement one or more methods as disclosed herein in one or more client devices. In various embodiments, programming instructions may be adapted to implement a browser, and in various ones of these embodiments, a browser may be adapted to allow a user to display information related to a network access. In an exemplary embodiment, programming instructions may be adapted to implement a browser on a client device.

Examples of client devices include a desktop computer, a laptop computer, a handheld computer, a tablet computer, a cellular telephone, a personal digital assistant (PDA), an audio and/or video player (e.g., an MP3 player or a DVD player), a gaming device, a navigation device (e.g., a GPS device), and/or other suitable fixed, portable, or mobile electronic devices.

Figure 2:
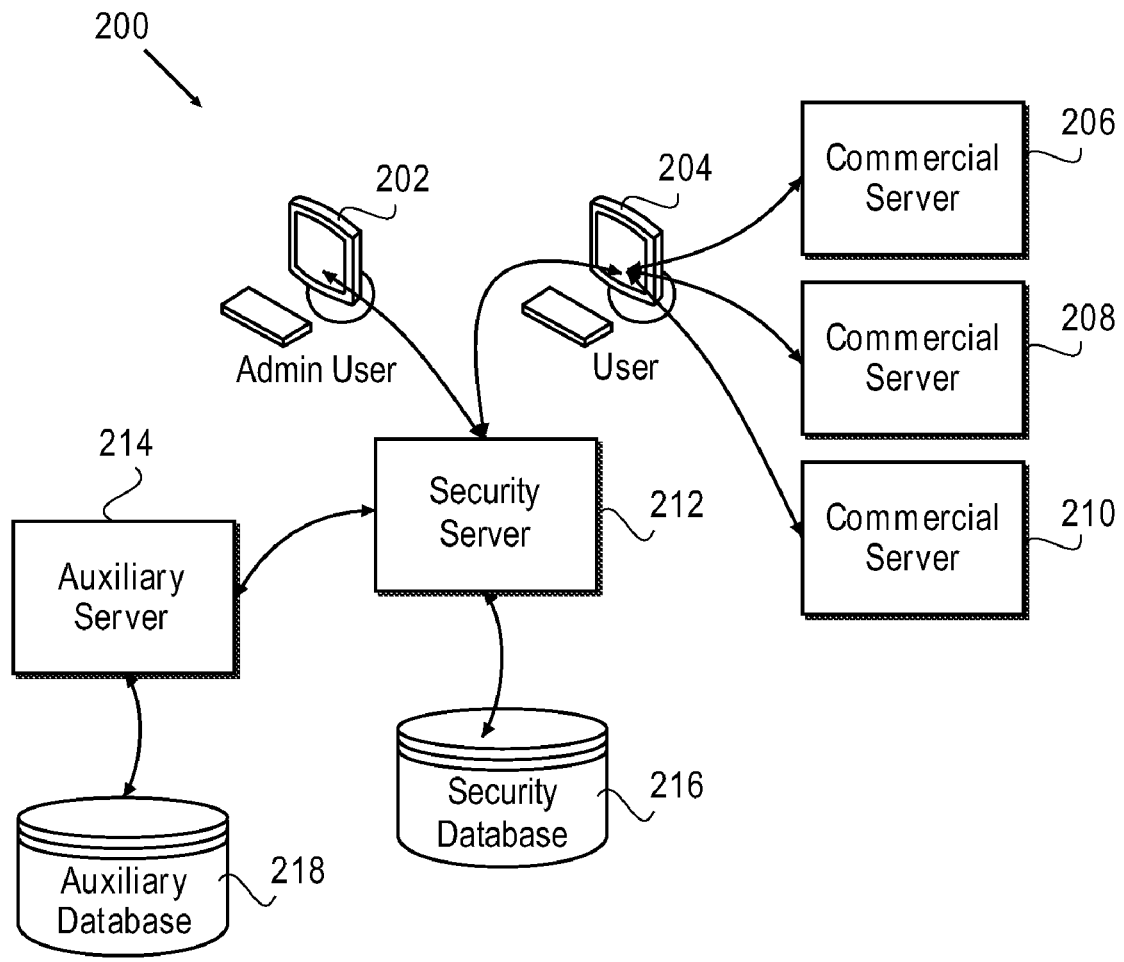
FIG. 2 schematically illustrates a computer network, in accordance with various embodiments of the present invention.

With reference to FIG. 2, an exemplary computer network 200 is schematically illustrated. The network 200 may include multiple computing systems 100 and/or parts thereof in the form of servers, client devices, databases, etc. The exemplary network 200 as illustrated includes two client devices 202, 204, three commercial servers 206, 208, 210, a security server 212 and an auxiliary server 214. A security database 216 and an auxiliary database 218 may also be provided. As may be seen, client devices 202, 204 may be communicatively coupled to the security server 212. Commercial servers as used herein are generally servers that have limited access and require proper authentication for access by client devices. Those skilled in the art will understand that more or fewer components may be included with network 200. Those skilled in the art will understand that the network components may be communicatively coupled via land lines and/or wireless communication forms and protocols. Furthermore, the communication may be provided over a network such as the Internet.

In accordance with various embodiments, a user of client device 202 may serve as an administrator that provides clearance or "permission" for a user of client device 204 to access various accounts at security server 212 commercial servers 206, 208, 210. As may be seen, client device 204 is communicatively coupled to commercial servers 206, 208, 210. If functioning as an administrator, client device 202 may or may not be communicatively coupled to commercial servers 206, 208, 210. For clarity, it is illustrated as not being communicatively coupled thereto.

In accordance with various embodiments of the present invention, an account is created at security server 212 via a website generated by security server 212. The website is generally accessed, as known in the art, via a browser at client device 202. In the illustrated example of FIG. 2, this account is created by client device 202 serving as an administrator for client device 204. Thus, a user of client device 204 is now authorized to access the created account at the security server.

In accordance with various embodiments with the present invention, the administrator user of client device 202 creates an account at one or more of the commercial servers for the user client device 204. The creation of these accounts is through the websites of the commercial servers that are generated by the servers. The client device 202 links the accounts of the commercial servers to the account at the security server 212 via an administrative interface at the website of the security server 212. Information regarding the accounts may be stored at the security server database 216 and/or auxiliary database 218.

In accordance with various embodiments, when a user of client device 204 wishes to access an account at one of the commercial server websites, the user of client device 204 logs onto the website generated by security server 212. This may be accomplished, for example, by the user accessing a webpage at the security server website and entering a name and a password. Alternatively, the user may access the security server via another application and enter a name and password. In either scenario, a digital certificate may be used in addition to or in place of entering a name and password. The client device 204 may connect to the security server 212 via, for example, secure hypertext transfer protocol (HTTPS) or some other Internet protocol.

In accordance with various embodiments of the present invention, security server 212 also verifies that client device 204 used by the user is authorized to access one or more commercial websites. This may be done, for example, via receipt of a collection of data from the client device 204, cookies, stored token information and/or other identifying features of client device 204. The verification of the client device 204 may be done by the security server 212 or by another server such as the auxiliary server 214. Verification of client device 204 may be done in place of or in conjunction with the previously described user verification. Additionally, challenge questions or out-of-band information may be also be used to verify identity of the user in addition to or in place of the name and password in certain instances (for example, if the user is using a new device to access the security server).

The user may then attempt to log onto a desired commercial server website via, for example, a user interface control on the website of security server 212. Additionally, the user may begin the process of logging onto the desired commercial server website via a desktop icon on the client device 204 that will begin the process of accessing the security server in a manner as previously described. In accordance with various embodiments, security server 212 verifies that the user has an account and/or log-in at the desired commercial server website via the security server database 216 or via auxiliary database 218. Another example of verifying the account and/or log-in includes a handshake process between security server 212 and the desired commercial server. Once the account and/or log-in is verified, security server 212 may allow the user to log into the website of the desired commercial server. This may be done by having the user log into an account at security server 212 with, for example, a user identification and/or password.

Once security server 212 has verified that the user and/or client device 204 are authorized to access the desired commercial server, in accordance with various embodiments security server 212 generates a web page that is sent to client device 204 and that contains code, such as for example, Java Script, that will create a web page that contains a form that is semantically equivalent to the log-in form for the desired commercial server website. In accordance with various embodiments, the log-in form is pre-filled in with the user's commercial server website account and password, as well as any other required credentials. The form may then be automatically posted to the desired commercial server website using, for example, HTTPS, as soon as the log-in form finishes loading from the security server to client device 204. Thus, in accordance with various embodiments, the user may not actually see the log-in form and thus, may not actually see the log-in web page for the desired commercial server website. The first page the user may see may be the landing page (the page after log-in) at the commercial server website.

Alternatively, in accordance with various embodiments, the security server may log into the desired commercial server and pass, via a secure protocol, a session identification to the client device 204 and/or a name and password to the client device for accessing the desired commercial server. The client may, in accordance with various embodiments, post log-in credentials to the desired commercial website by auto-posting a name and password to the desired commercial website's uniform resource locator (URL) at the security server 212, or by modifying data (either name and password or session identification) as a proxy between client device 204 and the desired commercial website.

A website, as used herein, is generally a collection of web pages, images, videos and other digital assets that is hosted on one or several web server(s), usually accessible via the Internet, cell phone or a local access network (LAN). A web page is a document typically written in Hypertext Markup Language (HTML) that is almost always accessible via HTTP or HTTPS, a protocol that transfers information from the web server to display in the user's web browser.

The administrator user of client device 202 may, in various embodiments, add and/or revoke authorization for a particular user and one or more of the user's client devices. Additionally, client device 204 may serve as its own administrator, i.e., a user of client device 204 may authorize client device 204 and other client devices (not shown) of the user to access web pages of one or more commercial servers 206, 208, 210 and likewise may revoke such authorization. Thus, system 200 may not have a dedicated administrator client device.

The auxiliary server 214 and database 218 may be utilized to supplement security server 212 and database 216. Auxiliary server 214 and auxiliary database 218 may be used to help generate various forms, authorization and identifiers for security server 212 and client devices 202, 204.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
   providing a security account for a user at a security website;
   linking another account of another website to the security account; and
   verifying, by the security website, that a device of the user is authorized to access the another account when the user attempts to access the another account via the security account.

2. The method of claim 1, further comprising verifying, by the security website, that the user has an account at the another website.

3. The method of claim 2, further comprising verifying, by the security website, that the user is allowed to access the another account at the another website.

4. The method of claim 1, further comprising automatically creating, by the security website, a login form for the another account.

5. The method of claim 4, wherein the login form is automatically filled in by the security website with the user's information.

6. The method of claim 5, wherein the login form is automatically posted by the security website to the another website to thereby log in the user to the another account.

7. The method of claim 6, wherein the login form is posted via secure hypertext transfer protocol (HTTPS).

8. An apparatus comprising a management block configured to provide a security account for a user at a security website generated by a managed platform hosting the apparatus, the management block being further configured to link another account of another website to the security account, and the management block being further configured to verify that a device of the user is authorized to access the another account when the user attempts to access the another account via the security account.

9. The apparatus of claim 8, wherein the management block is further configured to verify that the user has an account at the another website.

10. The apparatus of claim 9, wherein the management block is further configured to verify that the user is allowed to access the another account at the another website.

11. The apparatus of claim 8, wherein the management block is further configured to automatically create a login form for the another account.

12. The apparatus of claim 11, wherein the login form is automatically filled in by the management block with the user's information.

13. The apparatus of claim 12, wherein the login form is automatically posted by the management block to the another website to thereby log in the user to the another account.

14. The apparatus of claim 13, wherein the login form is posted via secure hypertext transfer protocol (HTTPS).

15. An article of manufacture comprising:
a storage medium; and
a set of instructions stored in the storage medium, which when executed by a processor of a managed platform that generates a security website cause the processor to perform operations comprising:
providing a security account for a user at the security website;
linking another account of another website to the security account; and
verifying, by the security website, that a device of the user is authorized to access the another account when the user attempts to access the another account via the security account.

16. The article of manufacture of claim 15, further comprising verifying, by the security website, that the user has an account at the another website.

17. The article of manufacture of claim 16, further comprising verifying, by the security website, that the user is allowed to access the another account at the another website.

18. The article of manufacture of claim 15, further comprising automatically creating, by the security website, a login form for the another account.

19. The article of manufacture of claim 18, wherein the login form is automatically filled in by the security website with the user's information.

20. The article of manufacture of claim 19, wherein the login form is automatically posted by the security website to the another website to thereby log in the user to the another account.

21. The article of manufacture of claim 20, wherein the login form is posted via secure hypertext transfer protocol (HTTPS).

* * * * *